(12) United States Patent
Fluent et al.

(10) Patent No.: US 6,814,174 B2
(45) Date of Patent: Nov. 9, 2004

(54) TELESCOPING SEAT ASSEMBLY FOR A CONSTRUCTION VEHICLE

(75) Inventors: Chad L. Fluent, St. Thomas, PA (US); Richard E. Whitfield, Evans, GA (US); Christopher L. Junga, Carlisle, PA (US)

(73) Assignee: Ingersoll-Rand Company, Montvale, NJ (US)

( * ) Notice: Subject to any disclaimer, the term of this patent is extended or adjusted under 35 U.S.C. 154(b) by 75 days.

(21) Appl. No.: 10/350,402

(22) Filed: Jan. 23, 2003

(65) Prior Publication Data

US 2004/0144590 A1 Jul. 29, 2004

(51) Int. Cl.[7] .......................... B60K 26/02; B60N 2/06; B60N 2/14; B62B 1/16
(52) U.S. Cl. .................. 180/329; 180/330; 296/65.06; 297/344.22; 297/344.24
(58) Field of Search ................................ 180/326, 329, 180/330, 331, 327, 323, 324; 296/65.06, 65.07; 297/344.24, 344.22

(56) References Cited

U.S. PATENT DOCUMENTS

| | | | |
|---|---|---|---|
| 2,446,906 A | * | 8/1948 | Buker ..................... 296/65.07 |
| 2,607,432 A | | 8/1952 | Lommel |
| 3,347,558 A | | 10/1967 | Grimes et al. |
| 4,392,546 A | | 7/1983 | Brown et al. |
| 5,052,512 A | | 10/1991 | Pakosh et al. |
| 5,086,869 A | | 2/1992 | Newberry et al. |
| 5,125,764 A | | 6/1992 | Veath, Sr. |
| 5,664,909 A | | 9/1997 | Lindgren et al. |
| 5,921,340 A | | 7/1999 | Abels |
| 6,086,142 A | | 7/2000 | Simmons et al. |
| 6,302,483 B1 | * | 10/2001 | Ricaud et al. ........... 29/344.24 |

FOREIGN PATENT DOCUMENTS

| | | | | |
|---|---|---|---|---|
| DE | 4304941 A1 | * | 8/1994 | ............ B60N/2/06 |
| EP | 343026 A | * | 11/1989 | ............ A61G/3/02 |
| FR | 2461473 A | * | 3/1981 | ............ A47C/3/18 |

* cited by examiner

Primary Examiner—Peter C. English
(74) Attorney, Agent, or Firm—Michael Best & Friedrich LLP

(57) ABSTRACT

A seat assembly is for a construction vehicle, preferably a compacting vehicle, and includes a base attached to the vehicle and having an axis and a rail movably connected with the base so as to be angularly displaceable about the base axis. The rail has a longitudinal centerline extending generally perpendicularly with respect to the base axis. A seat carriage is movably connected with the rail so as to be linearly displaceable along the rail centerline. A linkage is connected with the base and with the seat carriage and is configured to linearly displace the carriage along the rail centerline when the rail angularly displaces about the base axis, preferably between a most proximal position with respect to the base axis and a most distal position with respect to the axis. Preferably, the linkage includes a cam connected with the base and a follower connected with the carriage.

21 Claims, 8 Drawing Sheets

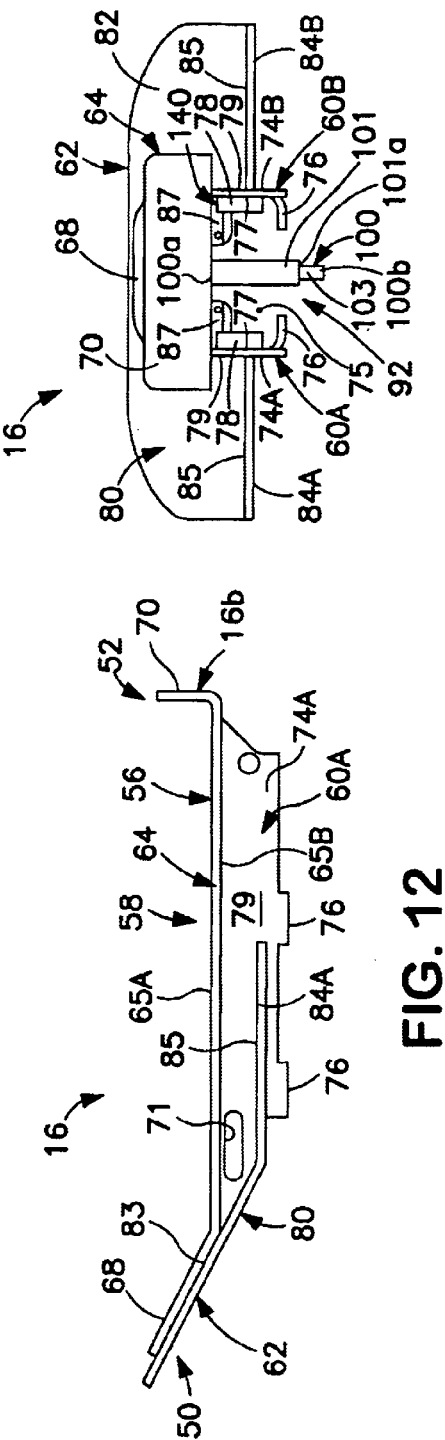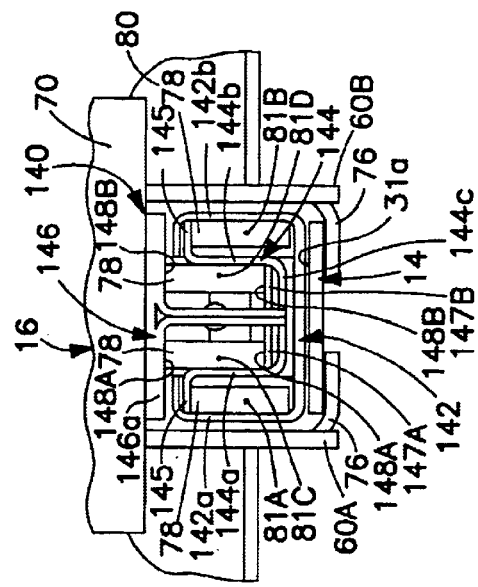

TELESCOPING SEAT ASSEMBLY FOR A CONSTRUCTION VEHICLE

BACKGROUND OF THE INVENTION

The present invention relates to construction vehicles, and more particularly to seat assemblies for construction vehicles.

Certain construction vehicles, such as pavers and compactors, are used to form mats of asphalt, concrete or similar materials for such applications as roadways, airport runways, parking lots, etc. A typical compactor or compacting vehicle includes a frame, one or two compacting drums attached the frame and a seat or operator station mounted to the frame. The drums roll over and compact paving material as the vehicle traverses sections of a mat of the paving material. When operating proximal to the edges of the mat, it is often necessary for an operator seated in the operator station to view the outer side edges of the one or more drums so as to guide the vehicle along the mat edges.

SUMMARY OF THE INVENTION

In one aspect, the present invention is a seat assembly for a construction vehicle. The assembly basically comprises a base attached to the vehicle and having an axis and a rail movably connected with the base so as to be angularly displaceable about the base axis. The rail has a longitudinal centerline extending generally perpendicularly with respect to the base axis. A seat carriage is movably connected with the rail so as to be linearly displaceable along the rail centerline. Further, a linkage is connected with the base and with the seat carriage, the linkage being configured to linearly displace the carriage along the rail centerline when the rail angularly displaces about the base axis.

In another aspect, the present invention is also a seat assembly for a construction vehicle, vehicle having a generally horizontal upper surface. The assembly basically comprises a rail rotatably connected with the vehicle so as to be angularly displaceable about a generally vertical axis extending perpendicular to the vehicle upper surface. The rail has a longitudinal centerline extending generally perpendicularly with respect to the vertical axis. A cam is connected with the vehicle and a seat carriage is slidably connected with the rail and has a follower portion engaged with the cam. As such, the carriage linearly displaces along the rail centerline when the rail angularly displaces about the vertical axis.

In a further aspect, the present invention is again a seat assembly for a construction vehicle. The assembly comprises a base attached to the vehicle and having an axis and a rail movably connected with the base so as to be angularly displaceable about the base axis. The rail has a longitudinal centerline extending generally perpendicularly with respect to the base axis. A seat carriage is movably connected with the rail so as to be linearly displaceable along the centerline. Further, a linkage has a first portion connected with the base and a second portion connected with the seat carriage. The linkage second portion is displaceable with respect to the first portion when the rail angularly displaces about the base axis so as to linearly displace the seat carriage along the rail centerline.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 12 is a side elevational view of the seat carriage;

FIG. 13 is a rear elevational view of the seat carriage, shown with the alternative roller assembly;

FIG. 14 is a broken-away, enlarged rear elevational view of the seat carriage and the rail, shown with a preferred roller assembly.

DETAILED DESCRIPTION OF THE INVENTION

Figure 1:
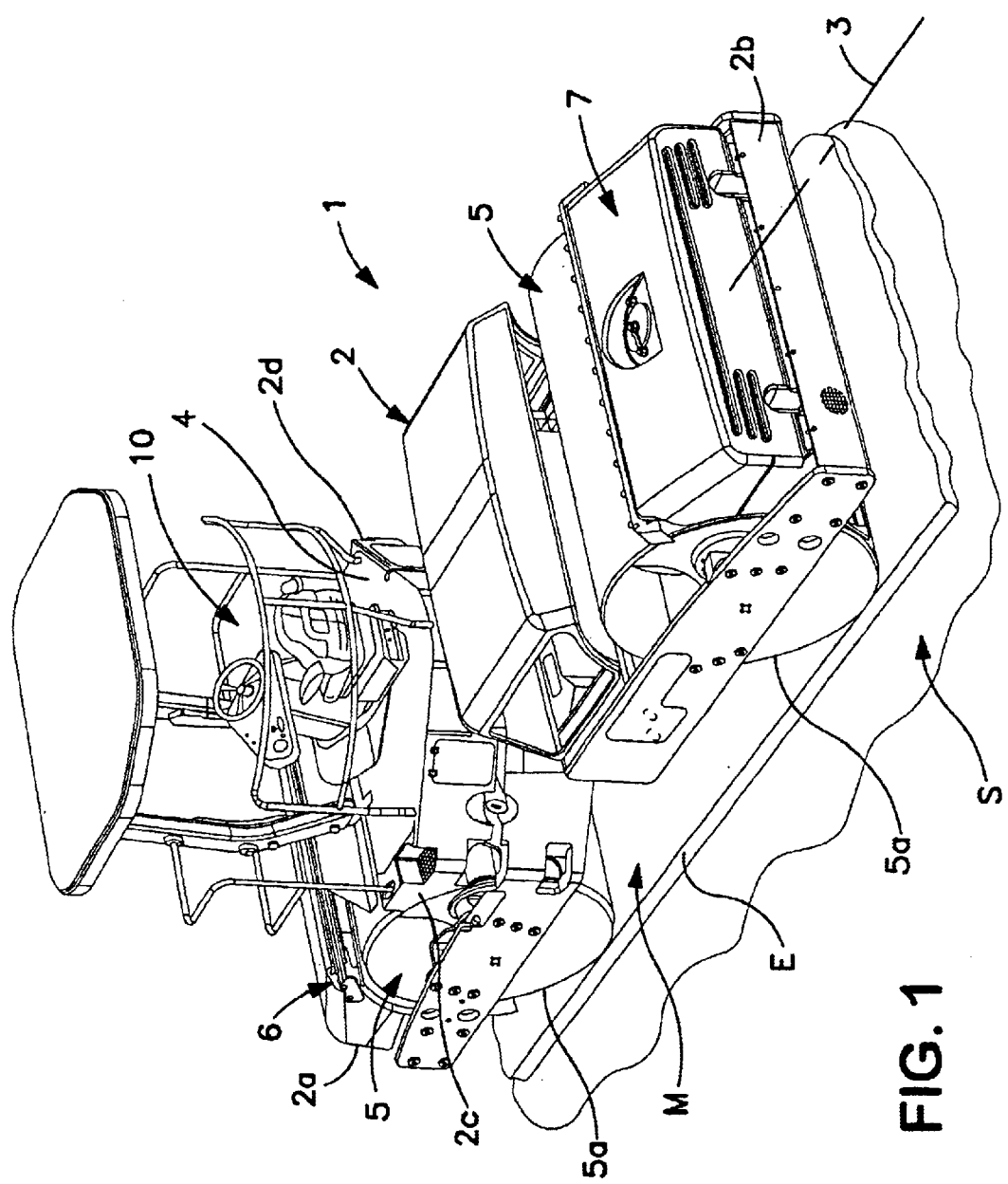
FIG. 1 is a perspective view, taken from the rear, of a compacting vehicle having a seat assembly in accordance with the present invention.

Certain terminology is used in the following description for convenience only and is not limiting. The words "right", left", "lower", "upper", "upward", "down" and "downward" designate directions in the drawings to which reference is made. The words "front", "frontward" and "rear", "rearward" refer to directions toward and away from, respectively, a designated front end of a construction vehicle. Further, as used herein, the word "connected" is intended to include direct connections between two members without any other members interposed therebetween and indirect connections between members in which one or more other members are interposed therebetween. The terminology includes the words specifically mentioned above, derivatives thereof, and words or similar import.

Referring now to the drawings in detail, wherein like numbers are used to indicate like elements throughout, there is shown in FIGS. 1–15 a presently preferred embodiment of a telescoping seat assembly 10 for a construction vehicle 1. The vehicle 1 has a frame 2 with a front end 2a, a rear end 2b, a longitudinal centerline 3 extending between the ends 2a, 2b, and two opposing sides 2c, 2d generally extending between the front and rear ends 2a, 2b, respectively. The seat assembly 10 basically comprises a base 12, a rail 14 connected with the base 12, a seat carriage 16 connected with the rail 14 and a mechanism or linkage 18 connected with the base 12 and the seat carriage 16. The base 12 is attached to the vehicle, preferably to a generally horizontal upper surface 4 of the vehicle frame 2, and has a generally vertical axis 13 extending generally perpendicularly with respect to the vehicle upper surface 4. The rail 14 is movably connected with the base 12 so as to be angularly displaceable or rotatable about the base axis 13. In addition, the rail 14 has a generally horizontal, longitudinal centerline 15 extending generally perpendicularly with respect to the base axis 13.

Figure 15:
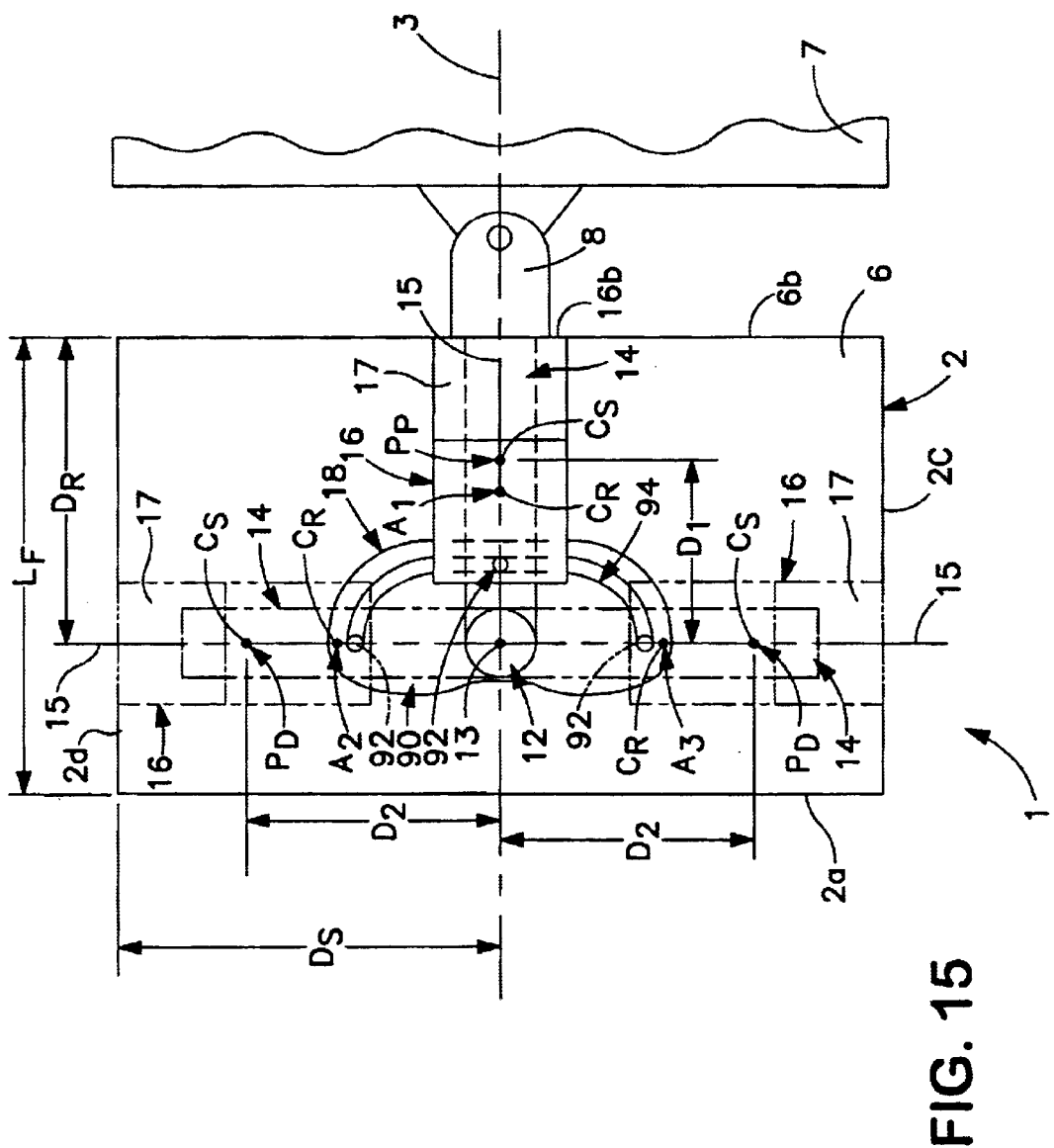
FIG. 15 is a more diagrammatic view of the seat assembly and compacting vehicle, showing the seat assembly located in three positions (two in phantom).

Further, the seat carriage 16 is movably connected with the rail 14 so as to be linearly displaceable along the rail centerline 15, the seat carriage 16 either having an upper seating surface 17 or a separate seat is connected with the carriage 16 to provide the seating surface 17, as discussed below. Furthermore, the linkage 18 is configured to linearly displace the seat carriage 16 along the rail centerline 15 when the rail 14 angularly displaces about the base axis 13, as discussed below. More specifically, the linkage 18 is configured to displace the seat carriage 16 between a first, most proximal position $P_P$ with respect to base axis 13 and a second, most distal position $P_D$ with respect to the base axis 13. As best shown in FIG. 15, the first and second carriage positions $P_P$, $P_D$, respectively, are spaced apart along the rail centerline 15, the first position $P_P$ being spaced a lesser distance $D_1$, from the base axis 13 and the second position $P_D$ being spaced a greater distance $D_2$ from the axis 13. It must be noted that each position $P_P$ and $P_D$ is indicated in the drawings by reference to the location of a designated carriage center $C_S$ that has been selected for convenience only. Thus, any other point or location on the seat carriage 16 is equally suitable for use as a reference to describe the features of the present invention.

Preferably, the rail 14 is movable within a generally horizontal plane (not indicated), spaced above and generally parallel with the vehicle upper surface 4, between at least first and second angular positions $A_1$, $A_2$, respectively, about the base axis 13, and is preferably also movable to at least a third angular position $A_3$ about the base axis 13. As with the seat carriage 16, each rail position $A_1$, $A_2$, $A_3$ is indicated in the drawings by the position of a designated rail center $C_R$ that has been selected for convenience only. When the rail 14 is disposed in the first position $A_1$, the rail centerline 15 extends generally parallel with respect to the vehicle centerline 3 (see FIGS. 2, 4 and 15). When located at the second position $A_2$, the rail centerline 15 extends generally perpendicularly with respect to the vehicle centerline 3 (see FIGS. 5 and 15). Further, when the rail 14 is located in the third angular position $A_3$ about the base axis 13, the rail centerline 15 extends generally perpendicular with respect to the vehicle centerline 15 (see FIGS. 3, 4 and 15). Thus, the second and third rail positions $A_2$, $A_3$, respectively, are located on opposing sides of the vehicle centerline 3.

When the rail 14 moves or rotates between the first and second rail positions $A_1$, $A_2$, respectively, the linkage 18 linearly displaces the seat carriage 16 between the first and second carriage positions $P_P$, $P_D$, respectively, and vice-versa. The linkage 18 also displaces the seat carriage 16 between the respective first and second carriage positions $P_P$ and $P_D$, and vice-versa, when the rail 14 moves between the first and third rail positions $A_1$, $A_3$. Thus, the seat carriage 16 is located at the second, distal carriage position $P_D$ when the rail 14 is disposed in either the second or the third rail positions $A_2$, $A_3$, respectively. Further, the carriage 16 is located proximal to one of the two vehicle frame sides $2c$ or $2d$ (shown at right side $2d$) when the rail 14 is disposed in the second rail position $A_2$ and the carriage 16 is located proximal to the other one of the two sides $2c$, $2d$ (shown at left side $2c$) when the rail 14 is disposed in the third rail position $A_3$. As such, the seat assembly 10 enables an operator located on the seating surface 17 to have a full view of both sides $2c$, $2d$ of the vehicle 1, as well as enabling the frame length $L_F$ to be reduced, as discussed in further detail below.

Referring now to FIGS. 1–3 and 15, the seat assembly 10 is preferably used with a compacting vehicle or compactor type of construction vehicle 1, most preferably a double-drum paving material compactor for applying paving material M onto a base surface S, as best shown in FIG. 1. As such, the vehicle 1 preferably includes front and rear compacting drums 5 rotatably connected with the frame 2, the seat assembly 10 enabling a generally unrestricted view of the side edges $5a$ of each drum 5 when the seat carriage 16 is located proximal to one of the frame sides $2c$, $2d$ as discussed above and in further detail below. Further, the frame 2 preferably includes front and rear frame halves 6, 7, respectively, pivotally connected by an articulation joint 8, the seat assembly 10 most preferably being located on the front frame half 6. However, the construction vehicle 1 may be any other type of compactor, such a soil compactor having only a single compacting drum, or any other appropriate type of construction or other type of vehicle, such as for example, a skid steer loader, a front end loader, a forklift, a surface-coating vehicle, an agricultural tractor, etc. The scope of the present invention includes these or any other appropriate applications of the present seat assembly 10 and is in no manner limited by the type of vehicle 1 with which the assembly 10 is used.

Referring to FIGS. 2 and 4–7, the base 12 preferably includes a generally cylindrical body 20, the body 20 being most preferably formed as a generally circular tube. The tubular base body 20 includes a hollow bore 24, the base axis 13 extending longitudinally through the center of the bore 24, and an outer circumferential surface 25. Preferably, the base 12 further includes a generally annular flange 26 disposed about the body circumferential surface 25 and generally centered between the upper and lower ends $20a$, $20b$, respectively, of the base body 20. The flange 26 is used to connect the base 12, and thereby the entire seat assembly 10, to the vehicle frame 2 and also functions to connect the preferred linkage 18 to the base 12 (as discussed below).

More specifically, the base 12 is preferably mounted to the vehicle frame 2 by first inserting the lower end $20b$ of the tubular body 20 through an opening 9 (FIG. 2) in an upper wall $6a$ of the front frame half 6 until the flange 26 contacts the frame upper surface 4. Then, the flange 26 is attached to the wall $6a$ by appropriate means (e.g., welding or threaded fasteners). Further, the base 12 also preferably includes a pair of stop blocks 28 attached to the body outer surface 25 at angularly spaced-apart locations above the flange 26. The stop blocks 28 engage with the rail 14 to prevent rail rotation beyond the second and third rail angular positions $A_2$, $A_3$, respectively, as discussed in further detail below.

Although the base 12 is preferably constructed as described above, the base 12 may be formed having any other appropriate structure that enables the seat assembly 10 to function generally as described herein. For example, the base 12 may be formed as a generally solid, cylindrical post (not shown) connected to the frame upper wall $6a$. The scope of the present invention embraces all appropriate constructions of the base 12 that are connectable with the rail 14 and the linkage 18 and permit the seat assembly 10 to function as described in the present disclosure.

Figure 8:
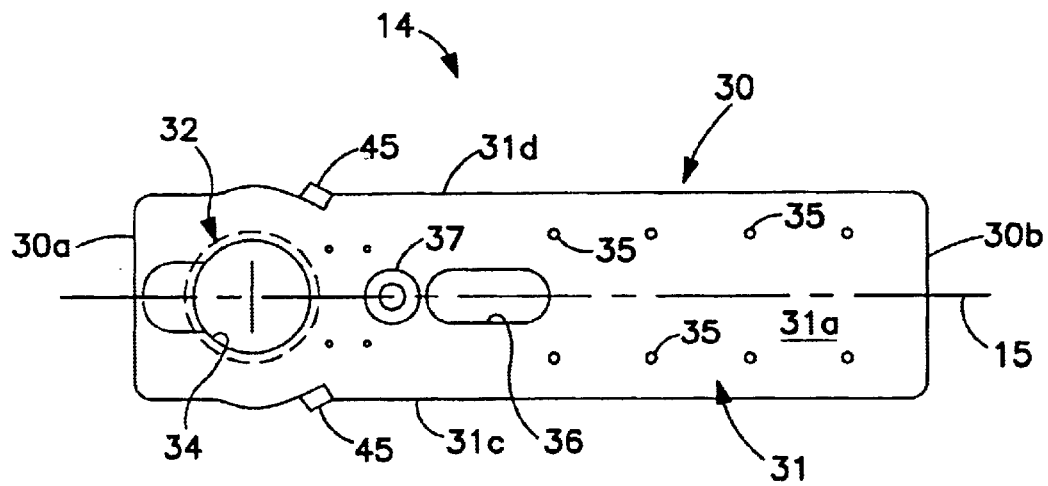
FIG. 8 is a top plan view of a rail of the seat assembly.
Figure 9:
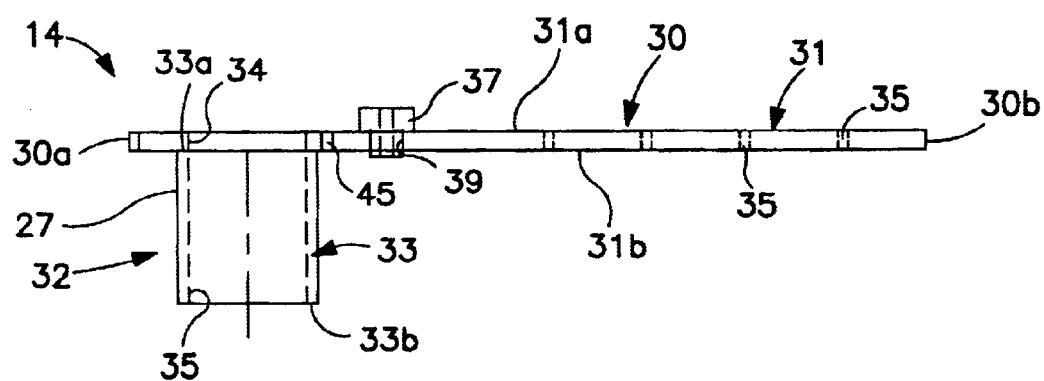
FIG. 9 is a side elevational view of the rail.
Figure 10:
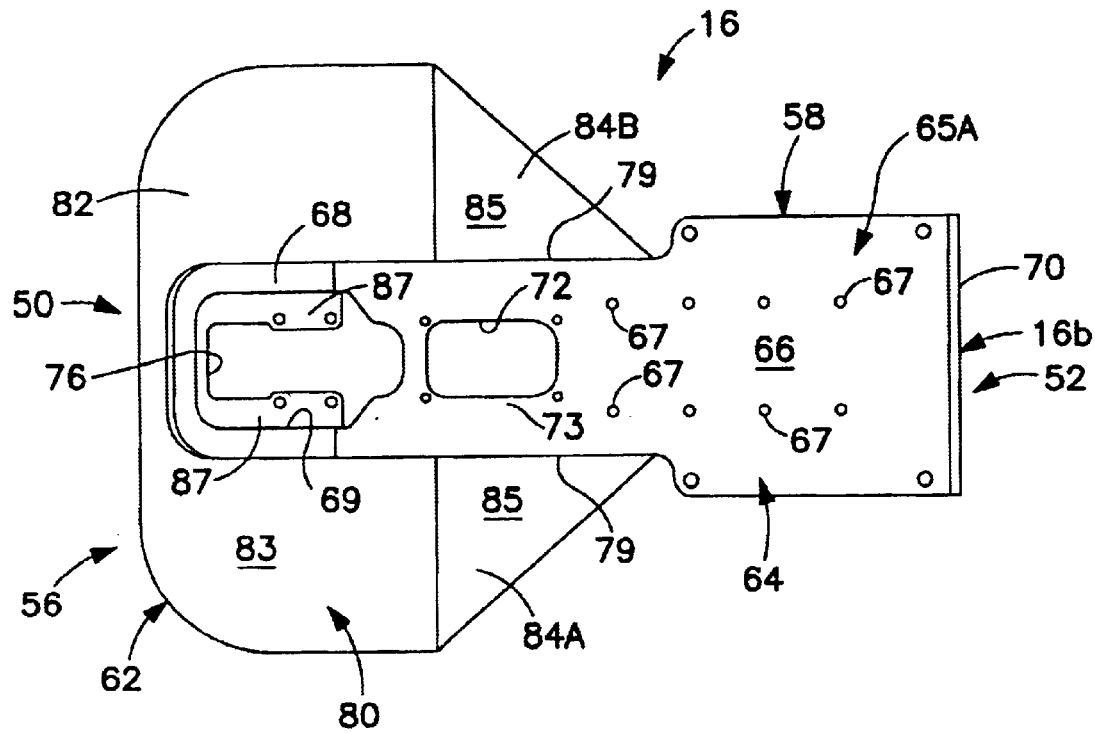
FIG. 10 is a top plan view of a seat carriage of the seat assembly.

Referring now to FIGS. 8 and 9, the rail 14 preferably includes an elongated body 30 having opposing inner and outer ends 30a, 30b, respectively, and a generally cylindrical connective portion 32 attached to the rail body 30 proximal to the inner end 30a. The rail body 30 is preferably formed as generally rectangular plate 31 having opposing upper and lower surfaces 31a, 31b and a circular through-hole 34 proximal to the rail inner end 30a. A slotted opening 36 is disposed in the plate 31 proximal to the circular through-hole 34 and is arranged so as to extend along the rail centerline 15. The slotted opening 36 provides clearance for a movable portion of the preferred linkage 18, as described in detail below.

Further, the rail body 30 also preferably includes a plurality of pairs of threaded openings 35 spaced along the rail centerline 15 for attaching portions of a preferred roller assembly 140 provided to facilitate sliding displacement of the carriage 16 upon the rail 14, as discussed below. Referring particularly to FIG. 8, the rail body 30 also preferably includes a pair of buffer blocks 45 each attached to a separate side edge 31c, 31d of the plate 31 so as to extend generally outwardly with respect to the rail centerline 15. The buffer blocks 45 are contactable with the base stop blocks 28 and function to absorb impact when the rail 14 contacts one of the stop blocks 28 during angular displacement to either the second or third rail positions $A_2$, $A_3$, respectively.

Preferably, the rail connective portion 32 is formed as a generally circular tube 33 having a central bore 35 and a circumferential outer surface 27. The connective portion 32 is attached to the rail body 30 so as to be centered about the through hole 34 and projects downwardly from the rail body lower surface 31b. More specifically, an upper radial end 33a of the tube 33 is abutted against an annular portion of the rail body lower surface 31b surrounding the hole 34 and is attached thereto by appropriate means, preferably by weldment material. The aligned rail through-hole 34 and connective portion bore 35 provide clearance for various hydraulic and electrical lines (none shown) that extend between locations within the frame 2 and various controls on the seat carriage 16, as described below.

Further, the connective portion 32 is preferably sized such that the circular tube 33 is receivable within the bore 24 of the tubular base body 20 (see FIG. 2) so that the tube outer circumferential surface 27 is slidable against the circumferential inner surface of the bore 24. After insertion into the base body 20, the tube 33 is retained within the body 20 by threadably attaching an end ring 29 to the lower end 33b of the tube 33. When disposed in the base 12, the circular tube 33 is rotatable within the base body 20 so as to angularly displace the connected rail body 30 about the base axis 13. Alternatively, the rail connective portion 32 may formed so as to be disposed about or around an upper portion of the base body 20, such as if the body 20 is formed as a generally solid post as discussed above.

Referring to FIGS. 1, 2, 4 and 9, the seat assembly 10 preferably includes a position locking device 150 connected with the rail 14 and configured to retain the rail 14 (and thus the connected seat carriage 16) at a fixed angular position about the base axis 13. The locking device 36 includes a lock pin 38 extending through a guide bushing 37 disposed in an opening 39 through the rail body 30 and a lifting mechanism (not shown) configured to vertically displace the lock pin 38. A rotatable actuator rod 42 extends horizontally through an opening 71 in the seat carriage 16 so as to operably connect with the lifting mechanism and a foot lever 43 is attached to an outer end of the rod 42. The lock pin 38 is biased generally downwardly through the guide bushing 37 by a spring 41 (FIG. 2) to separately engage with each one of plurality of locator holes 44 arranged about the base 12, preferably disposed within a portion of the preferred linkage 18 as discussed below. When the lock pin 38 is disposed within one of the locator holes 44, the rail 14 is coupled to the base 12 in a manner such that angular displacement of the rail 14 about the base axis 13 is prevented. The locator holes 44 are spaced circumferentially about the base axis 13 such that when the lock pin 38 is engaged with one of the locator holes 44, the rail 14 is located at one of a plurality of specific angular positions about the base axis 13 (e.g., $A_1$, $A_2$, $A_3$, etc.)

Further, rotation of the actuator rod 42 in one direction causes the lifting mechanism to displace the pin 38 upwardly (i.e., against the spring-bias) such that the pin 38 is extracted from a particular locator hole 44. Furthermore, the foot lever 43 functions to rotate the actuator rod 42 about a longitudinal axis (not indicated) through the rod 42 so as to release the lock pin 38. The lever 43 is engageable by an operator's foot to enable the carriage 16 to be readily uncoupled from the base 12 whenever the operator desires to reposition the seat assembly 10 about the base axis 13.

Referring now to FIGS. 1–5 and 10–13, the seat carriage 16 preferably includes a first, support portion 50 disposed generally proximal to the base axis 13 and a second, seat base portion 52 connected with the first portion 50. The second carriage portion 52 is spaced from the first portion 50 along the rail centerline 15 so as to be located generally distally with respect to the base axis 13. The first carriage portion 50 is configured to support a vehicle control console 19 and has at least one foot supporting surface 54 upon which an operator rests their feet when seated on the seating surface 17. The second carriage portion 52 either includes a seating surface 17 or is configured to support a separate seat member having a seating surface 17. However, the carriage 16 may alternatively be formed so as to include only the "second" seat base portion 52 slidably attached to the rail 14, in which case the control console 19 is connected with another portion of the seat assembly 10 and foot rest surface 54 being provided by another component (e.g., the rail 14) or omitted altogether.

Preferably, the carriage 16 is constructed as a single frame 56, most preferably as a weldment, having the first and second portions 50, 52 integrally formed or connected together. More specifically, the frame 56 is preferably constructed of three main structural sections: a seat platform 58, a pair of slide rails 60A, 60B attached to the platform 58 and slidably connectable with the rail 14, and an inner or front support member 62 attached to the inner ends of the seat platform 58 and the slide rails 60A, 60B.

Referring particularly to FIGS. 10–13, the seat platform 58 is preferably formed as a generally rectangular, elongated plate 64 having upper and lower horizontal surfaces 65A, 65B. The rear portion of the plate 64 is enlarged compared to the remainder of the plate 64 so as to provide a relatively wide seat mounting surface section 66. The platform plate 64 also has an upwardly angled inner or front end portion 68, the front end portion 68 being attached to the support member 62 and having a front clearance hole 69, and an upwardly-bended outer or rear end portion providing a rear support wall 70. Further, the seat platform 58 also has a generally rectangular central clearance hole 72 aligned with the slotted opening 36 in the rail body 30 and surrounded by an annular mounting surface section 73 provided for connecting a portion of the preferred linkage 18 to the carriage 16, as described below.

Figure 4:
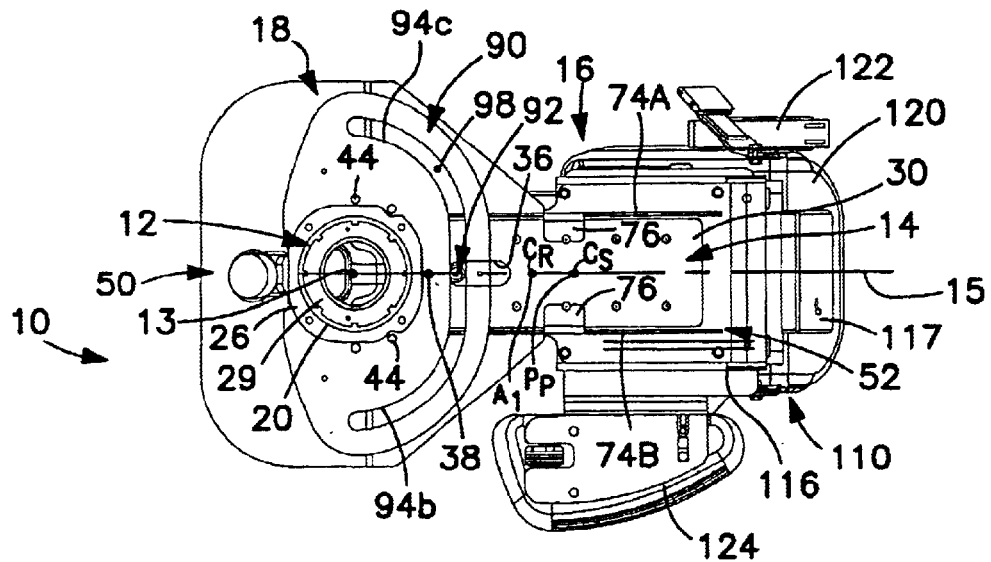
FIG. 4 is bottom plan view of the seat assembly in the first rail position.
Figure 5:
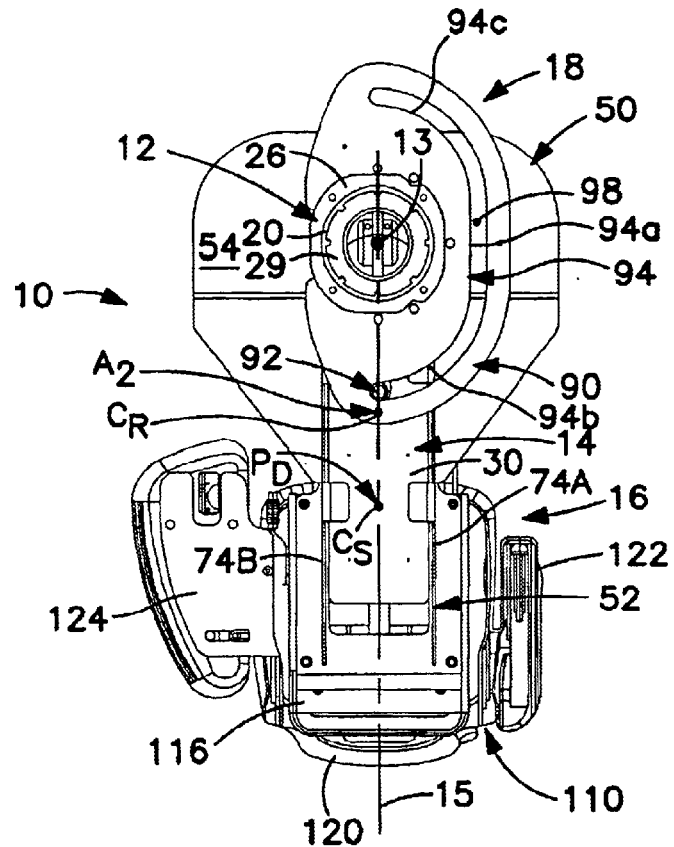
FIG. 5 is a bottom plan view of the seat assembly in a second position.

The slide rails 60A, 60B are preferably formed as a pair of spaced-apart, elongated rectangular plates 74A, 74B attached to the lower surface 65B of the platform plate 64 and located so as to extend generally parallel with the rail centerline 15. Alternatively, the slide rails 60A, 60B may be provided by a single channel bar or C-beam (not shown) attached to the platform plate lower surface 65B. The two rail plates 74A, 74B and a portion of the platform plate 64 located between the rails 74A, 74B define an open channel 75 configured to receive at least a portion of the rail body 30, as best shown in FIG. 13. Each slide rail 60A and 60B includes a pair of retainer tabs 76 extending across the open channel 75 toward an associated tab 76 on the other rail 60B or 60A. When the carriage 16 is disposed on the rail 14, the retainer tabs 76 extend beneath the rail body 30 such that the tabs 76 function to retain the carriage 16 on the rail 14, as shown in FIGS. 4 and 5. Also, the left slide rail 60A includes a slotted opening 71 providing sufficient clearance for the actuating rod 41 of the position locking device 150, as discussed above, such that the carriage 16 is able to displace along the rail 14 without contacting the rod 41.

Figure 11:
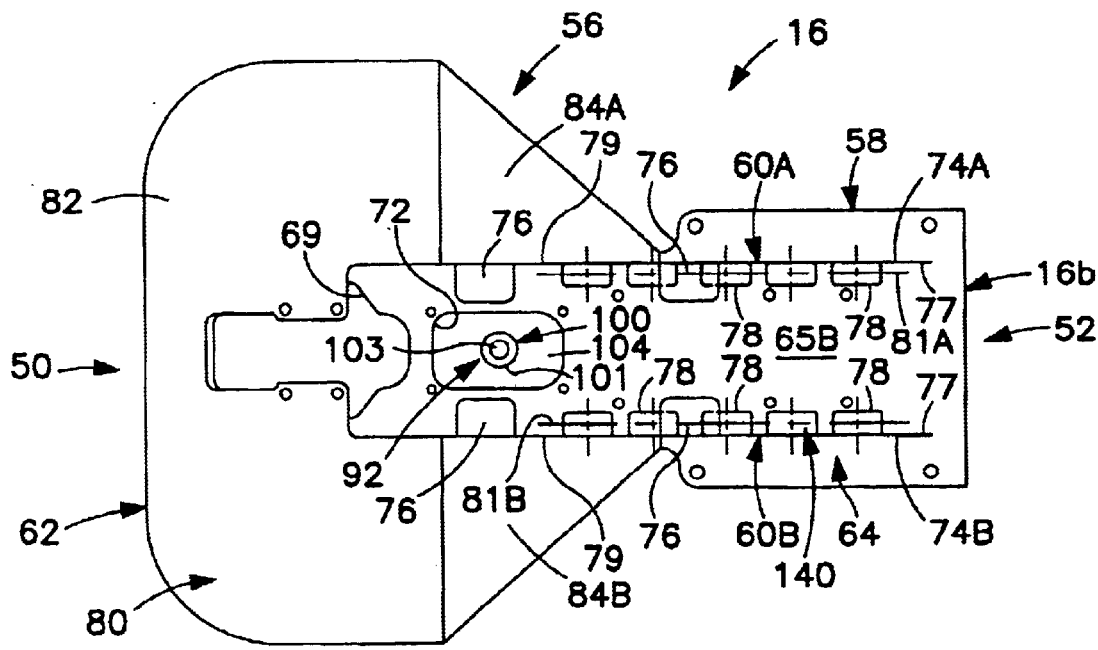
FIG. 11 is a bottom plan view of the seat carriage, shown with a connected follower and an alternative roller assembly.

Referring to FIGS. 11, 13 and 14, the seat assembly 10 preferably includes a roller assembly 140 disposed generally between the rail 14 and the carriage 16 and configured to facilitate sliding displacement of the carriage 16 along the rail centerline 15. Preferably, the roller assembly 140 includes a plurality of wheels 78 arranged in at least two rows 81A, 81B and preferably four rows 81A, 81B, 81C, 81D, each row 81A-81D extending parallel to the rail axis 15. The roller assembly 140 is preferably a commercially available roller assembly, and most preferably a Model# CC5200-99-0081 Roller Bearing Slide from General Devices Inc. of Indianapolis, Ind.

Referring specifically to FIG. 14, the preferred roller assembly 140 includes a lower, generally C-shaped elongated base member 142 attached to the rail body upper surface 31a, preferably by means of threaded fasteners extending through the holes 35. The base member 142 has two pairs of wheels 78 (only two shown) each mounted to a separate one of two parallel vertical sidewalls 142a, 142b. A central elongated slide member 144 has two upper, outer rail portions 145 that each slide over a separate pair of the wheels 78 on the lower base member 142. The central slide member 144 further includes two pairs of wheels 78 (only two shown) each attached to a separate one of two parallel vertical walls 144a, 144b, which are connected by a horizontal base wall 144c. Further, an upper, generally I-shaped elongated slide member 146 is attached to the seat platform lower surface 65B of the carriage 16, preferably by means of threaded fasteners inserted through the holes 67. The upper slide member 146 has an upper horizontal wall 146a and two lower, inner rail portions 147A, 147B spaced below the upper wall 146a, such that two pairs of facing, horizontal rolling surfaces 148A, 148B are provided between the rail portions 147a, 147b and the wall 146a. Each pair of wheels 78 of the central slide member 144 roll between a separate one of the two pairs of rolling surfaces 148A, 148B of the upper slide member 146 when the upper member 146 slides with respect to the central member 144.

With the above-described structure, the carriage 16 displaces from the proximal position $P_P$ to the distal position $P_D$ by extending or "expanding" the preferred roller assembly 140 in two stages. Specifically, the central slide member 144 first slides over the wheels 78 of the lower base member 142 until reaching a maximum extended position (not shown) with respect to the lower member 142. Then, the upper slide member 146 slides over the wheels 78 of the central member 144 until the upper member 146 reaches a maximum extended position (not shown) with respect to the central member 144. When the carriage 16 displaces from the distal position $P_D$ to the proximal position $P_P$, the preferred roller assembly 140 "collapses" in two stages by first retracting the upper slide member 146 with respect to the central slide member 144 and then retracting the upper and central members 146 and 144 with respect to the lower base member 142.

Alternatively, the roller assembly 140 may be provided by a plurality of separate wheels 78 rotatably connected to the inner vertical surface 77 of each slide rail 60A, 60B and arranged in two rows 81A and 81B that extend generally parallel with respect to the rail centerline 15, as shown in FIGS. 11 and 13. When the carriage 16 is disposed upon the rail 14, the wheels 78 of each row 81A, 81B roll upon the upper surface 31a of the rail body 30 so as to facilitate displacement of the carriage 16 along the rail centerline 15. As yet further alternatives, the seat assembly 10 may be provided with any other appropriate device(s) to facilitate sliding of the carriage 16 upon the rail 14, for example, one or more hardened plates (none shown) disposed on either the rail 14 or the carriage 16 and one or more wear pads (none shown) attached to the other one of the carriage 16 or rail 14 and located so as to slide along the hardened plate(s).

Still referring to FIGS. 10–13, the support member 62 is preferably formed as a relatively large, bended plate 80 having an angled, generally rectangular inner or front portion 82 and a pair of generally horizontal triangular side portions 84A, 84B extending rearwardly from the front portion 82. The support plate front portion 82 is attached to the angled front end 68 of the platform plate 64 and extends vertically upwardly with respect to the remainder of the carriage frame 56 such that an upper foot-supporting surface 83 faces generally toward the seating surface 17. Also, the support plate front portion 82 further includes a central, generally rectangular through hole 76 bordered by two mounting surfaces 87 used to connect the control console 19 to the carriage 16, as discussed below. Further, each one of the two triangular side sections 84A, 84B extend generally horizontally along, and is attached to, the outer vertical surface 79 of the proximal rail 60A, 60B, respectively. The triangular sections 84A, 84B of the support member 62 each provide an additional foot support surface 85.

Although the seat carriage 16 is preferably formed as the frame or weldment 56 as described above, it is within the scope of the present invention to construct the carriage 16 in any appropriate manner that enables the seat assembly 10 to function as generally described herein. For example, the seat carriage 16 may be formed as a generally solid block, a generally rectangular frame or a formed plate (none shown), the specific carriage structure being slidably connected with the rail 14, connected with linkage 18 and configured to provide only the seating surface 17. Such alternative carriage structures may be formed without a support member or other front support portion, in which case the seat assembly 10 preferably includes a pivotable control console (not shown) attached to the base 12. The present invention encompasses these and any other appropriate constructions of the seat carriage 16 that enable the seat assembly 10 to function generally as described herein.

Referring now to FIGS. 1–7 and 15, the linkage 18 preferably includes a cam 90 connected with the base 12 and a follower 92 connected with the seat carriage 16. The follower 92 is engageable with the cam 90 such that angular displacement of the rail 14 about the base axis 13 causes the follower 92 to displace with respect to the cam 90 so as to linearly displace the seat carriage 16 along the rail 14. More specifically, the cam 90 has a camming surface 94 that extends circumferentially about the base axis 13 and the follower 92 is contactable with the camming surface 94. When the rail 14 angularly displaces about the base axis 13, the follower 92 displaces along the camming surface 94 to thereby displace the seat carriage 16 along the rail centerline 15.

Preferably, the cam 90 is formed as a generally flat, rounded plate 96 attached to the base 12 and having a circular central opening 97 and a generally semi-circular slotted opening 98 spaced from and extending circumferentially partially about the central opening 97. The slotted opening 98 is partially bounded by a curved surface that provides the camming surface 94. The camming surface 94 is generally continuous and includes a first surface section 94a with a first radius $R_1$ about the base axis 13, a second surface section 94b with a second radius $R_2$ about the base axis 13, and a third surface section 94c with a third radius $R_3$ about the base axis 13. The second and third camming surface sections 94b, 94c are preferably located on opposing sides of the first camming surface section 94a and each extends to an opposing outer end 98a, 98b, respectively, of the semi-circular slotted opening 98. The two outer ends 98a, 98b of the cam slot 98 limit the movement of the follower 92 in each angular direction (i.e., clockwise and counterclockwise) about the base axis 13, and thereby establish the second and third rail positions $A_2$, $A_3$, respectively.

Further, the second and third radii $R_2$, $R_3$ are preferably of substantially equal value and each radius $R_2$ and $R_3$ is substantially greater than the first radius $R_1$. As such, when the follower 92 displaces along the camming surface 94 between either the first and second surface sections 94a, 94b, respectively, or between the first and third surface sections 94a, 94c, the follower 92 is caused to displace radially with respect to the base axis 13. Such radial movement of the follower 92 causes the connected seat carriage 16 to linearly displace along the rail centerline 15. In other words, displacement of the follower 92 from the first camming surface section 94a to either the second or the third camming surface section 94b, 94c, respectively, causes the follower 92 to displace radially outwardly away from the base axis 13, thereby displacing the seat carriage 16 from the proximal seat position $P_P$ to the distal seat position $P_D$. Alternatively, displacement of the follower 92 from either the second or the third camming surface Section 94b, 94c to the first camming surface section 94a causes the follower 92 to displace radially inwardly toward the base axis 13, thereby displacing the seat carriage 16 from the distal seat position $P_D$ to the proximal seat position $P_P$.

Furthermore, when the seat assembly 10 is mounted to the vehicle 1, the cam plate 96 is arranged such that the slotted opening 98 is generally centered across the vehicle centerline 3, as best shown in FIG. 15, the cam plate 96 and base 12 being fixedly (i.e., non-movably) connected with the frame 2. Specifically, the first camming surface section 94a extends across and is centered on the vehicle centerline 3 and the second and third camming surface sections 94b, 94c, respectively, are disposed on opposing sides of the centerline 3. Further, the outer ends 98a, 98b of the slotted opening 98 are located substantially equidistant from the vehicle centerline 3, one end 98a establishing the second rail position $A_2$ and the other end 98b establishing the third rail position $A_3$. With such an arrangement of the cam 90, the seat carriage 16 is disposed in the proximal carriage position $P_P$, and is located proximal to the rear end 6b of the front frame half 6, when the rail 14 is arranged with the rail centerline extending generally along the vehicle centerline 3. Further, the seat carriage 16 is disposed in the distal position $P_D$, and is located proximal to one of the vehicle sides 2c or 2d, when the rail 14 is arranged such that the rail centerline 15 extends generally perpendicular to the vehicle centerline 3.

Figure 6:
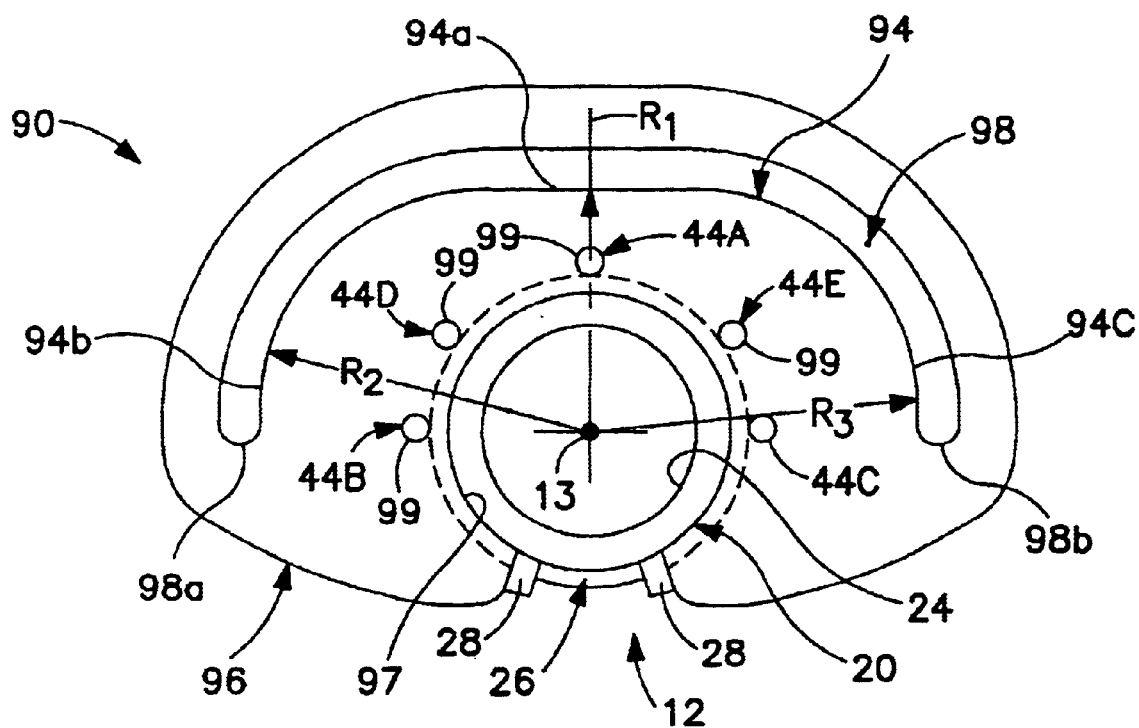
FIG. 6 is a top plan view of a base and a cam of the seat assembly.
Figure 7:
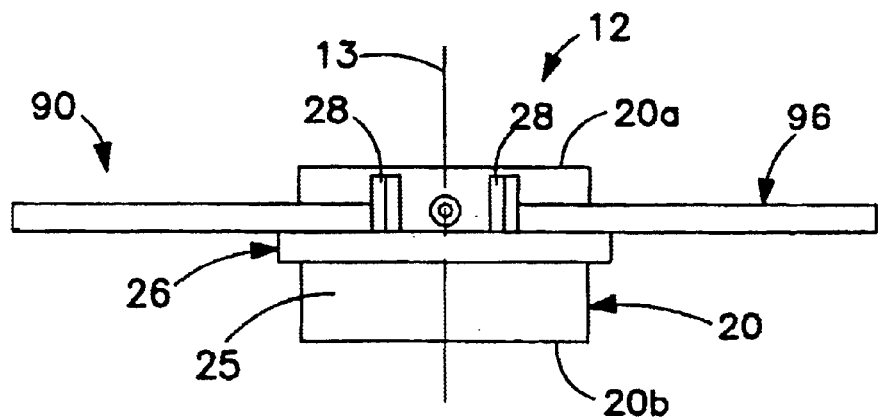
FIG. 7 is a side elevational view of the base and cam.

Referring particularly to FIG. 6, the cam plate 96 preferably further includes a plurality of through holes 99, and most preferably five holes 99, spaced circumferentially about the central opening 97 and disposed generally between the slotted opening 98 and the central opening 97. Each through hole 99 provides a separate one of the locator holes 44, as discussed above, such that each one of the holes 99 is arranged to correspond to a separate angular position of the rail 14 with respect to the base axis 13. More specifically, a first locator hole 44A corresponds to the first rail position $A_1$, second and third locator holes 44B, 44C respectively, each correspond to the second and third rail positions $A_2$, $A_3$, respectively. Further, a fourth locator hole 44D corresponds to a rightward forty-five degree position (not depicted) intermediate the first and second rail positions $A_1$, $A_2$, and a fifth locator hole 44E corresponds to a leftward forty-five degree position (not depicted) intermediate the first and third rail positions $A_1$, $A_3$. Thus, the position-locking device 150 is used to retain the rail 14 in one of the described rail positions by inserting the lock pin 38 into the corresponding one of the locator holes 44A-44E. Although it is preferred to provide the described five locator holes 44A–44E in the cam plate 96, the cam 90 may alternatively be provided with a greater or lesser number of the locator holes 44, arranged at any appropriate locations, or the locator holes 44 may be disposed in/through a different component (none shown) connected with the base 12.

Preferably, the cam 90 is connected with the base 12 by inserting the upper end 20a of the base body 20 through the through hole 97 so that the cam plate 96 is disposed against the base flange 26. The cam plate 96 is then attached to the flange 26 by appropriate means, preferably by a plurality of threaded fasteners (not indicated) so that the cam 90 is readily removable from the base 12 (e.g., for replacement purposes).

Referring to FIGS. 2, 4, 5, 11 and 13, the follower 92 is preferably formed as a generally circular pin 100 having a first end 100a connected with the seat carriage 16 and a second end 100b disposed within the slotted opening 98 of the cam 90 so as to contact the camming surface 94. As such, when the rail 14 angularly displaces about the base axis 13, the second end 100b of the pin 100 displaces within the slotted opening 98 between the first and second surface sections 94a, 94b, or between the first and third surface sections 94a, 94c, so as to linearly displace the seat carriage 16 along the rail centerline 15, as discussed above. Further, the pin 100 is preferably formed having a "stepped" body including an upper, larger diameter body portion 101 attached to the carriage 16 and a lower, smaller diameter body portion 103 disposed within the cam slotted opening 98. Furthermore, the upper body portion 101 has a lower radial surface 101a that slides upon sections of the cam plate 96 adjacent to the slotted opening 98.

Referring particularly to FIG. 11, the upper end 100a of the follower pin 100 is mounted to a base plate 104 attached to the annular mounting surface 73 of the carriage platform plate 64, such that the base plate 104 extends across, and the pin 100 extends downwardly through, the platform central clearance hole 72. As such, the follower 92 is readily attachable to and removable from the carriage 16 for purposes such as servicing or replacement. Further, the follower 92 extends through the slotted opening 36 in the rail body 30, the slotted opening 36 being sized to provide sufficient clearance for movement of the pin 100 relative to the rail body 30 when the carriage 16 displaces between the first and second carriage positions $P_P$, $P_D$, respectively.

Although the linkage 18 is preferably a cam and follower mechanism as described above, the linkage 18 may alternatively be constructed as any other type of linkage or mechanism capable of causing the seat carriage 16 to displace along the rail 14 when the rail 14 pivots or rotates about the base 12. For example, the linkage 18 may be constructed as a four-bar mechanism, such as a crank connected with the base 12 and a slider disposed within a longitudinal slot in the rail 14 and attached to the seat carriage 16 (neither shown). Further for example, the linkage 18 may be formed as a gear set (none shown) configured to transform rotational movement of the seat assembly 10 about the base axis 13 into displacement of the carriage 16, such as an appropriately constructed rack-and-pinion gear set or a worm gear set. The scope of the present invention encompasses these and all other appropriate structures of the linkage 18 capable of displacing the seat carriage 16 along the rail 14 in a manner generally as described herein.

Referring now to FIGS. 1–5, the seat assembly 10 preferably further comprises a separate seat 110 attached to the seat carriage 16 and providing the seating surface 17. Preferably, the seat 110 includes a base frame 116 attached to the mounting surface 66 of the seat platform 58, a seat bottom 118 mounted to the upper surface of the base frame 116 and including the seating surface 17, and a seat back 120 attached to the base frame 116 by means of support member 117. Further, left and right arm supports 122, 124, respectively, extend inwardly from the seat back 120, the left support 122 being attached to the back 120 and the right support 124 being attached to the base frame 116. Preferably, the right arm support 124 includes at least a propulsion lever 126 configured to control the primary drive system (not indicated) of the compacting vehicle 1 and may include other control devices (none indicated).

Figure 2:
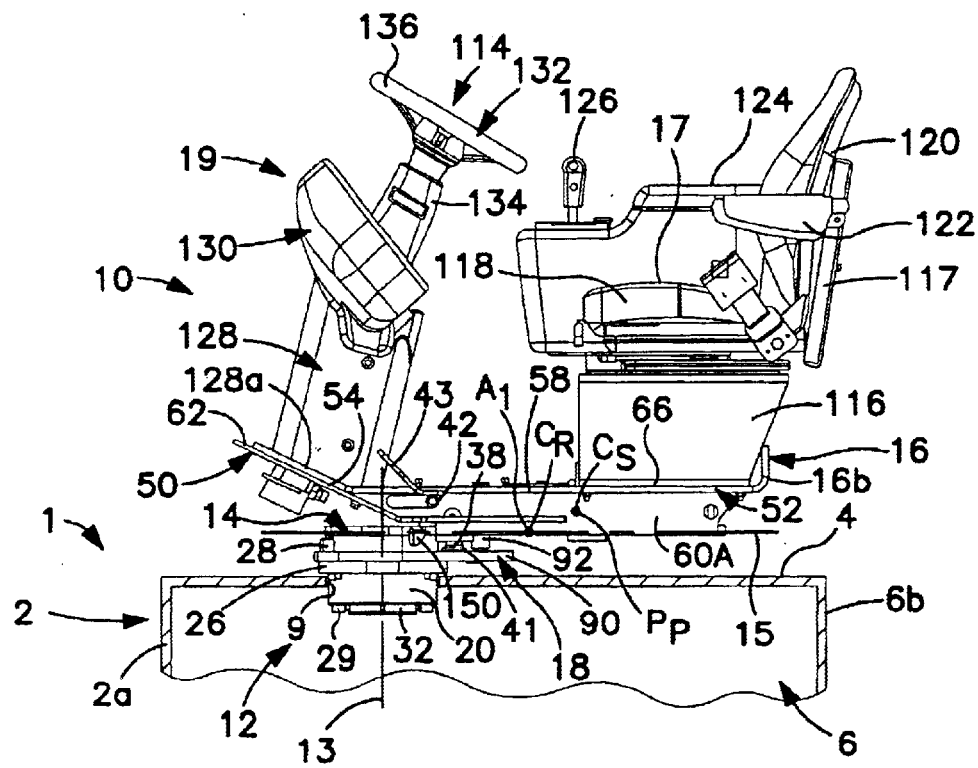
FIG. 2 is a partly broken-away, side elevational view of the seat assembly on the compacting vehicle shown in a first position.
Figure 3:
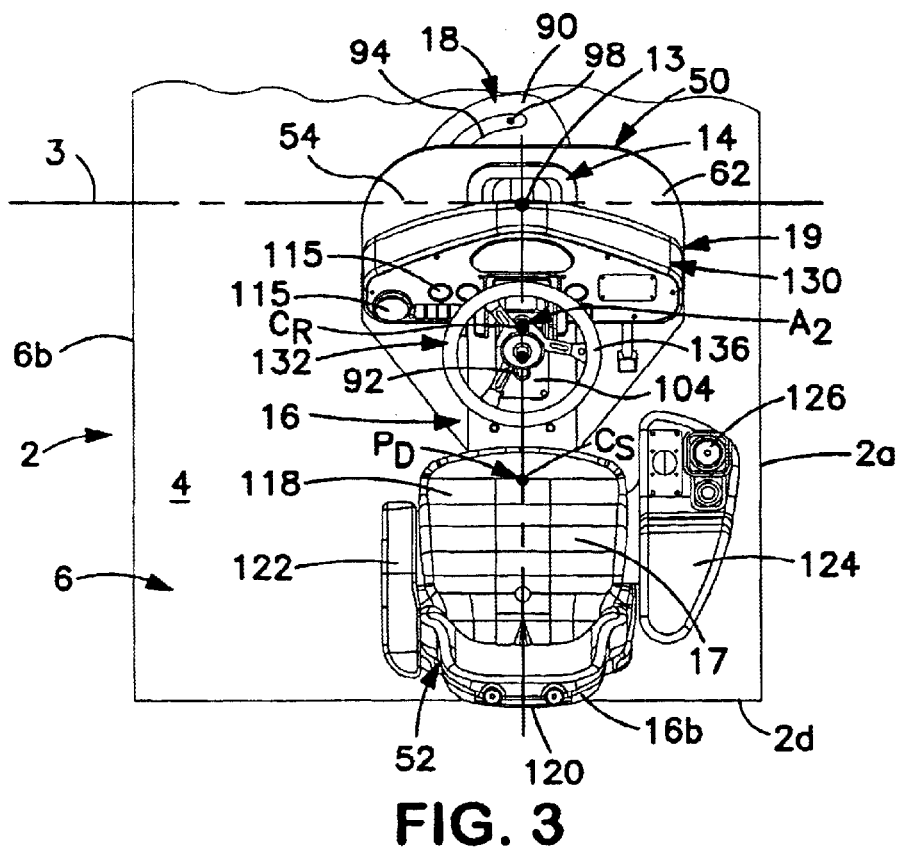
FIG. 3 is top plan view of the seat assembly shown in a third position.

Referring now to FIGS. 1–3, the control console 19 is preferably connected with the seat carriage 16 and is configured to support at least one vehicle control device 114 in a location accessible to a human operator disposed on the seat 110. Preferably, the control console 19 includes a lower support column 128 connected with the carriage support plate 62 and an upper control panel 130. The support column 128 has a lower end 128a fixedly attached to the mounting surfaces 87 of the carriage support member 62, but may alternatively by pivotally attached to the support member 62. A steering wheel assembly 132 is connected to the control panel 130 and includes a housing 134 attached to the panel 130, a steering wheel 136 rotatably mounted to the housing 134 and an oribtrol (not shown) disposed within the housing 134 and operatively connected to the wheel 136. Rotation of the wheel 136 causes the oribtrol to appropriately direct steering fluid to flow through hoses (none shown) extending through the support column 128 and through the aligned rail openings 34 and 35 to a steering mechanism (not shown) of the vehicle 1. Further, the control panel 130 also preferably includes other control devices 114, for example a watering system control switch (not shown), and various indicator devices 115, such as an engine tachometer (not shown).

Referring particularly to FIG. 15, in use, an operator located within the seat assembly 10 of the present invention (i.e., sitting on seat 110) is able to operate the compacting vehicle 1 while located in any one of a plurality of seat positions about the base axis 13. When driving the vehicle 1 between job sites or performing compacting operations for which the locations of the drum edges 5a are not critical, the operator normally operates the vehicle 1 with the seat assembly 10 arranged such that the rail 14 is located at the first or "0 degree" position $A_1$, at which the rail 14 extends along the vehicle centerline 3 and the seat carriage 16 is disposed in the first, proximal position $P_P$. When the seat assembly 10 is so positioned, the second or outer end 16b of the seat carriage 16 is preferably located proximal to the rear end 6b of the front frame half 6.

When is it desired to use the vehicle 1 to compact along the edges E of a material mat M, the operator first engages the foot release lever 43 to uncouple the carriage 16 from the cam 90. Then, the operator pushes against the upper surface 4 of the vehicle 1 to cause the rail 14 and carriage 16 to rotate towards the side 2c or 2d of the frame 2 proximal to the mat edge E. As the rail 14 rotates about the base axis 13, the carriage 16 slides outwardly along the rail centerline 15 so that when the rail 14 reaches the second or third angular positions $A_2$ or $A_3$, respectively, the seating surface 17 is located proximal to the side 2c or 2d of the vehicle frame 2. The operator is then able to view the edges 5a of the drums 5 to ensure that the drum edges 5a roll along the mat edges E. Further, if the operator desires to have a clearer view over ones side of the vehicle frame 2, but does not need to be seated at either frame side 2c or 2d, the seat assembly 10 may be disposed at any position between the first position and either of the second or third rail positions, such as the rightward and leftward forty-five degree positions as described above.

The seat assembly 10 of the present invention is clearly advantageous over previously known seat assemblies. Due to the seat carriage 16 being positionable in both a proximal position $P_P$ and a distal position $P_D$, the overall length $L_F$ of the front frame half 6 may be minimized while still fully supporting the seat assembly 10 in all positions. In other words, since the seat carriage 16 is located more proximal to the base axis 13 when the seat assembly 10 extends along the frame centerline 3, the frame 2 may be formed with a lesser distance $D_R$ between the rear end 6b of the frame half 6 and the base axis 13 while still fully supporting the seat assembly 10 upon the frame upper surface 4. Further, the seat assembly 10 is still capable of positioning the seating surface 17 proximal to the frame sides 2c and 2d, which are each located a greater distance $D_S$ from the base axis 13 as compared with the distance $D_R$ to the frame rear end 6b. The distance between the two frame sides 2c, 2d is established by the axial length (not indicated) of the compacting drum(s) 5, the drum axial length preferably being maximized to increase the amount of paving material (i.e., mat surface area or width) compactable by the vehicle 1 during each pass over the mat M.

It will be appreciated by those skilled in the art that changes could be made to the embodiments or constructions described above without departing from the broad inventive concept thereof. It is understood, therefore, that this invention is not limited to the particular embodiments or constructions disclosed, but it is intended to cover modifications within the spirit and scope of the present invention as generally described herein.

We claim:

1. A seat assembly for a construction vehicle, the assembly comprising:

a base attached to the vehicle and having an axis;

a rail movably connected with the base so as to be angularly displaceable about the base axis, the rail having a longitudinal centerline extending generally perpendicularly with respect to the base axis;

a seat carriage movably connected with the rail so as to be linearly displaceable along the rail centerline; and a linkage connected with the base and with the seat carriage, the linkage being configured to linearly displace the carriage along the rail centerline when the rail angularly displaces about the base axis.

2. The seat assembly as recited in claim 1 wherein the linkage is configured to displace the seat carriage between a first, most proximal position with respect to the base axis and a second, most distal position with respect to the base axis, the first and second carriage positions being spaced apart along the rail centerline.

3. The seat assembly as recited in claim 2 wherein:

the vehicle has a front end, a rear end and a longitudinal centerline extending between the ends;

the rail is movable between a first angular position about the base axis at which the rail centerline extends generally parallel with respect to the vehicle centerline and a second angular position about the base axis at which the rail centerline extends generally perpendicular with respect to the vehicle centerline; and the linkage displaces the seat carriage between the first and second carriage positions when the rail moves between the first and second rail positions.

4. The seat assembly as recited in claim 3 wherein the vehicle further has two opposing sides extending between the front and rear ends and the rail is further movable to a third angular position about the base axis at which the rail centerline extends generally perpendicular to the vehicle centerline and the seat carriage is located at the second carriage position, the second and third rail positions being located on opposing sides of the vehicle centerline, the seat carriage being located proximal to one of the two vehicle sides when the rail is disposed in the second rail position and the seat carriage is located proximal to the other one of the two vehicle sides when the rail is disposed in the third rail position.

5. The seat assembly as recited in claim 1 wherein the vehicle has a generally horizontal upper surface, the base is attached to the vehicle upper surface such that the base axis extends in generally vertical directions, and the rail is movable within a generally horizontal plane spaced above and generally parallel with the vehicle upper surface.

6. The seat assembly as recited in claim 1 wherein the linkage includes:

a cam connected with the base; and a follower connected with the seat carriage and engageable with the cam such that angular displacement of the rail about the base axis causes the follower to displace with respect to the cam so as to linearly displace the seat carriage along the rail.

7. The seat assembly as recited in claim 6 wherein:

the base includes a generally circular tubular body, the axis extending centrally through the tubular body; and the cam is formed as a plate attached to the tubular body and having a slotted opening providing a cam surface extending partially about the axis.

8. The seat assembly as recited in claim 1 wherein the linkage includes:

a cam connected with the base and having a camming surface; and a follower connected with the seat carriage and contactable with the camming surface such that when the rail angularly displaces about the base axis, the follower displaces along the camming surface to displace the seat carriage along the rail centerline.

9. The seat assembly as recited in claim 8 wherein the camming surface is generally continuous and includes a first surface section with a first radius about the base axis and a second surface section with a second radius about the base axis, the second radius being substantially greater than the first radius such that when the follower displaces along the camming surface between the first and second surface sections, the seat carriage linearly displaces along the rail centerline.

10. The seat assembly as recited in claim 9 wherein:

the cam has a slotted opening, the slotted opening being partially bounded by a surface that provides the camming surface; and the follower is a pin having a first end connected with the seat carriage and a second end disposed within the slotted opening so as to contact the camming surface, such that when the rail angularly displaces about the axis, the pin displaces within the opening between the first and second surface sections so as to linearly displace the seat carriage along the rail centerline.

11. The seat assembly as recited in claim 1 wherein the linkage includes:

a plate attached to the base and having a slotted opening providing a camming surface; and a follower pin connected with the seat carriage and contactable with the camming surface such that when the rail angularly displaces about the base axis, the pin displaces along the camming surface to displace the seat carriage along the rail centerline.

12. The seat assembly as recited in claim 1 further comprising a control console configured to support at least one vehicle control device and connected with the seat carriage such that the console angularly displaces about the base axis when the rail rotates with respect to the base and linearly displaces along the rail centerline when the seat carriage moves along the rail.

13. The seat assembly as recited in claim 1 wherein the base includes a generally cylindrical body and the rail has a generally cylindrical portion disposed one of about the base body and within the base body so as to rotatably connect the rail with the base.

14. The seat assembly as recited in claim 1 wherein the rail includes an elongated plate having a first end rotatably connected with the base and a second, free end spaced apart from the first end along the centerline.

15. The seat assembly as recited in claim 1 wherein the seat carriage is a frame disposed at least partially about the rail so as to be slidably displaceable along the rail centerline.

16. The seat assembly as recited in claim 1 further comprising:

a seat attached to the seat carriage; and a control console connected with the seat carriage and configured to support at least one vehicle control device in a location accessible to a human operator disposed on the seat.

17. The seat assembly as recited in claim 1 wherein the seat carriage includes:

a first carriage portion configured to support a vehicle control console and having at least one foot supporting surface; and a second carriage portion connected with the first portion and spaced along the rail centerline so as to be located more distally with respect to the base axis than the first portion, the second carriage portion one of having a seating surface and being configured to support a seat member.

18. The seat assembly as recited in claim 17 wherein the seat carriage is a frame including the first carriage portion integrally formed with the second carriage portion.

19. A seat assembly for a construction vehicle, the vehicle having a generally horizontal upper surface, the assembly comprising:

a rail rotatably connected with the vehicle so as to be angularly displaceable about a generally vertical axis extending perpendicular to the vehicle upper surface, the rail having a longitudinal centerline extending generally perpendicularly with respect to the vertical axis;

a cam connected with the vehicle; and a seat carriage slidably connected with the rail and having a follower portion engaged with the cam such that the carriage linearly displaces along the rail centerline when the rail angularly displaces about the vertical axis.

20. A seat assembly for a construction vehicle, the assembly comprising:

a base attached to the vehicle and having an axis;

a rail movably connected with the base so as to be angularly displaceable about the base axis, the rail having a longitudinal centerline extending generally perpendicularly with respect to the base axis;

a seat carriage movably connected with the rail so as to be linearly displaceable along the centerline; and a linkage having a first portion connected with the base and a second portion connected with the seat carriage, the second portion being displaceable with respect to the first portion when the rail angularly displaces about the base axis so as to linearly displace the seat carriage along the rail centerline.

21. The seat assembly as recited in claim 20 wherein:

the first linkage portion is a plate having a slotted opening providing a continuous camming surface extending partially about the axis, the surface having a first section with a first radius about the axis and a second section with a second radius about the axis, the second radius being substantially greater than the first radius; and the second linkage portion is a projection connected with the seat carriage and disposed at least partially within the slotted opening so as to contact the camming surface, such that when the rail angularly displaces about the axis, the projection displaces within the opening between the first and second sections so as to linearly displace the seat carriage along the rail centerline.

* * * * *